(12) United States Patent
Chang et al.

(10) Patent No.: US 9,248,794 B2
(45) Date of Patent: Feb. 2, 2016

(54) CONFIGURING USER CUSTOMIZABLE OPERATIONAL FEATURES OF A VEHICLE

(71) Applicant: INTEL CORPORATION, Santa Clara, CA (US)

(72) Inventors: Sherry S. Chang, El Dorado Hills, CA (US); Jason Martin, Beaverton, OR (US); Abhilasha Bhargav-Spantzel, Santa Clara, CA (US); Hormuzd M. Khosravi, Portland, OR (US); Craig T. Owen, Folsom, CA (US)

(73) Assignee: INTEL CORPORATION, Santa Clara, CA (US)

( * ) Notice: Subject to any disclaimer, the term of this patent is extended or adjusted under 35 U.S.C. 154(b) by 56 days.

(21) Appl. No.: 14/128,569

(22) PCT Filed: Aug. 26, 2013

(86) PCT No.: PCT/US2013/056667
§ 371 (c)(1),
(2) Date: Dec. 20, 2013

(87) PCT Pub. No.: WO2015/030710
PCT Pub. Date: Mar. 5, 2015

(65) Prior Publication Data
US 2015/0057839 A1    Feb. 26, 2015

(51) Int. Cl.
*B60R 16/037*    (2006.01)

(52) U.S. Cl.
CPC ........... *B60R 16/037* (2013.01); *B60R 16/0373* (2013.01)

(58) Field of Classification Search
CPC .................... B60R 16/037; B60R 16/0373
See application file for complete search history.

(56) References Cited

U.S. PATENT DOCUMENTS

| 8,527,146 | B1 * | 9/2013 | Jackson et al. ................... 701/36 |
| 2007/0290554 | A1 | 12/2007 | Teshima et al. |
| 2008/0024296 | A1 * | 1/2008 | Jeong ........................ 340/539.26 |
| 2008/0140265 | A1 * | 6/2008 | Hong et al. ....................... 701/2 |
| 2013/0135118 | A1 * | 5/2013 | Ricci ........................... 340/932.2 |

FOREIGN PATENT DOCUMENTS

| KR | 10-2006-0003133 A | 1/2006 |
| KR | 10-1166351 B1 | 7/2012 |
| WO | WO 2012-160298 A1 | 11/2012 |

OTHER PUBLICATIONS

International Search Report and Written Opinion mailed May 22, 2014 for International Application No. PCT/US2013/056667, 14 pages.

* cited by examiner

*Primary Examiner* — John Q Nguyen
*Assistant Examiner* — Michael Kerrigan
(74) *Attorney, Agent, or Firm* — Schwabe, Williamson & Wyatt, P.C.

(57) ABSTRACT

Embodiments of apparatus and methods for configuring user customizable operational features of a vehicle are described. In embodiments, an apparatus may include a communication module configured to be disposed in the vehicle, and communicate with a mobile device a user. The apparatus may further include a controller configured to be disposed in the vehicle and coupled with the communication module, to obtain from the mobile device, one or more preferences of the user for one or more user customizable features of the vehicle, and adjust the one or more user customizable operational features of the vehicle based at least in part on the one or more preferences of the user obtained. Other embodiments may be described and/or claimed.

23 Claims, 8 Drawing Sheets

CONFIGURING USER CUSTOMIZABLE OPERATIONAL FEATURES OF A VEHICLE

CROSS REFERENCE TO RELATED APPLICATIONS

The present application is a national phase entry under 35 U.S.C. §371 of International Application No. PCT/US2013/056667, filed Aug. 26, 2013, entitled "CONFIGURING USER CUSTOMIZABLE OPERATIONAL FEATURES OF A VEHICLE", which designated, among the various States, the United States of America. The Specification of the PCT/US2013/056667 Application is hereby incorporated by reference.

FIELD OF THE INVENTION

The present disclosure relates generally to the technical field of control systems, and more particularly, to apparatuses and methods for configuring user customizable operational features of a vehicle.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

Vehicles are often shared by multiple drivers, such as in the case of family cars, rental cars, Zipcar®, or Car2Go®. Frequent adjustments of vehicle settings may be necessary when a driver or passenger get into the vehicle, for example, due to different personal traits and/or preferences of the drivers or passengers.

Many modern vehicles may be equipped with electrical motors and switches, which may significantly expedite the driver adjustments process. Some vehicles, particularly in the high-end market, may be equipped with digital motor controls that may retain the "memory" of a driver's preference for power seats, power mirrors, power windows, and preset radio stations, etc. However, the number of memory settings is likely finite, and the memory setting of a driver may not be portable or ported across vehicles.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
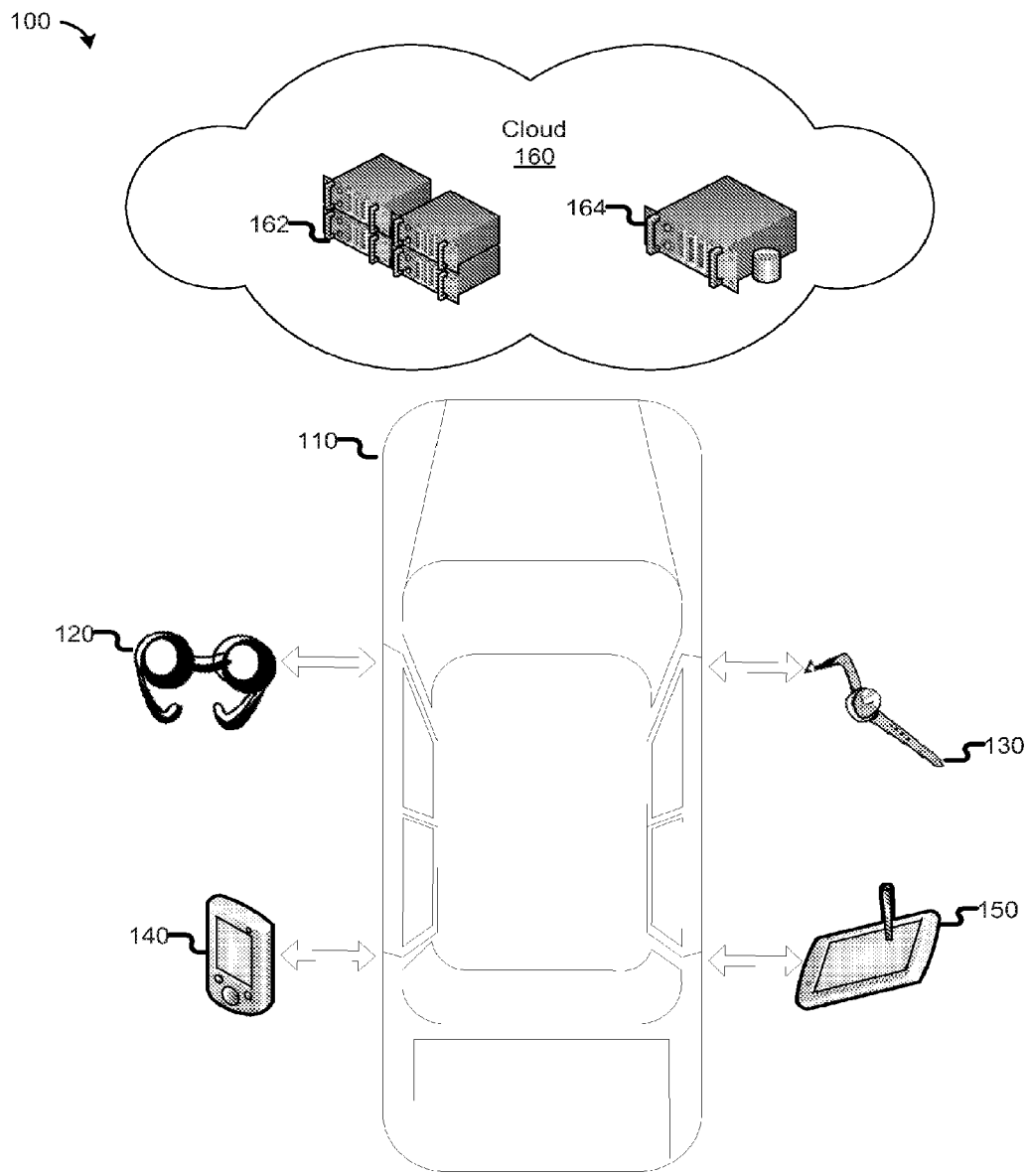
FIG. 1 is a schematic diagram illustrating an example system configuration for configuring user customizable operational features of a vehicle, incorporating aspects of the present disclosure, in accordance with various embodiments.

Embodiments of apparatus and methods for configuring user customizable operational features of a vehicle are described herein. In embodiments, an apparatus may include a communication module configured to be disposed in the vehicle, and communicate with a mobile device of a user, e.g., a smartphone of the user. The apparatus may further include a controller configured to be disposed in the vehicle and coupled with the communication module, to obtain from the mobile device, one or more preferences of the user for one or more user customizable operational features of the vehicle, e.g., steering wheel position, and adjust the one or more user customizable operational features of the vehicle based at least in part on the one or more preferences of the user obtained. These and other aspects of the present disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The description may use the phrases "in one embodiment," "in an embodiment," "in another embodiment," "in embodiments," "in various embodiments," or the like, which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, an example system configuration for configuring user customizable operational features of a vehicle, in accordance with various embodiments, is illustrated. System 100 may include vehicle 110 with various user customizable operational features, and one or more mobile devices of one or more users, which may respectively have access to preferences of the one or more users for the user customizable operational features of the vehicle. Mobile devices may include, e.g., wearable devices 120,130, or portable devices 140, 150. Mobile devices may be configured to wirelessly connect to service devices in computing cloud 160 (hereinafter, cloud 160), such as servers 162 or 164. As will be described in more detail below, vehicle, service devices, and user devices may be respectively incorporated with corresponding teachings of the present disclosure to enable dynamic configuration of user customizable operational features of a vehicle according to preferences of a user. Resultantly, user experience of vehicle drivers may be enhanced.

In embodiments, vehicle 110 may be a variety of vehicles, such as, but not limited to, a car, a truck, a bus, a boat, a ship, a train, or a motorhome. In other embodiments, vehicle 110 may also be a watercraft, sailcraft, aircraft, hovercraft, spacecraft and/or any vehicle suitable to be driven or otherwise operated by a person or used for transporting passengers or cargo. In embodiments, vehicle 110 may have user customizable operational features, such as features associated with its mechanical or electronic components or systems of vehicle 110. For examples, user customizable operational features may include steering wheel position, head restraint position, light settings, seat settings, mirror settings, seat belt settings, air bag settings, transmission settings, mode of operation, window settings, interior climate settings, infotainment settings, etc. In embodiments, vehicle 100 may be shared by multiple drivers, such as in the case of family, company or rental vehicles. Vehicle 100, enhanced by the teachings of this disclosure, may automate part or all of adjustments for user customizable operational features of the vehicle according to the preferences of the driver or passenger who uses the vehicle.

In embodiments, as described earlier, mobile devices in system 100 may include heterogeneous computing devices, such as, but not limited to, wearable devices 120 or 130, and portable devices 140 or 150, incorporated with the teachings of the present disclosure. Wearable device 120 and/or 130 may be wearable miniature computers, also known as body-borne computers. In embodiments, wearable device 120 and/ or 130 may have a device body or form factor with shape, dimension, and materials configured for the device to be worn by a user. As an example, wearable device 120 may have a form factor configured to be worn on a head, such as in the arrangement of eyeglasses. As another example, wearable device 130 may have a form factor configured to be worn on a wrist, such as in the arrangement of watches. In embodiments, wearable device 120 and/or 130 may also be worn by the bearer under, with, or on top of clothing near other parts of a human body, such as the arm, leg, neck, foot, etc.

In embodiments, portable device 140 may be a portable communication device, such as a smartphone, and portable device 150 may be a portable computing device, such as a tablet computer. While not illustrated, mobile devices in system 100 may also include a handheld computer, a laptop, a cellular phone, a pager, an audio and/or video player (e.g., an MP3 player, a DVD player, etc.), a gaming device, a video camera, a digital camera, a navigation device (e.g., a GPS device), a wireless peripheral (e.g., a headset, etc.), and/or other suitable mobile electronic devices, enhanced with the teachings of the present disclosure.

In embodiments, wearable devices 120, 130 or portable devices 140, 150 may have access to preferences for user customizable operational features of vehicles of the users of the devices. The preferences of a user may include one or more preferences for steering wheel position, head restraint position, lights settings, seat settings, mirror settings, seat belt settings, air bag settings, transmission settings, mode of operation, window settings, interior climate settings, infotainment settings, etc.

In embodiments, a user may have multiple sets of preferences for user customizable operational features of vehicles. As an example, a user may have different sets of preferences based on whether the user is a driver or a passenger. As another example, a user may have different sets of preferences based on the type or the model of the vehicle. Yet as another example, a user may have different sets of preferences based on time of day and/or geographical location of the user/vehicle.

In embodiments, preferences for user customizable operational features of vehicles of a user may be stored in a mobile device of the user, such as wearable devices 120 and 130 or portable devices 140 and 150. In embodiments, preferences for user customizable operational features of vehicles of a user may be stored in a remote server device, such as server devices 162 and 164 in in cloud 160, configured to be retrievable via a mobile device of the user.

In embodiments, mobile devices and/or vehicle 110 in system 100 may be configured to communicate with cloud 160, a computing infrastructure complex. Cloud 160 may support cloud computing which generally refers to an adequately resourced computing model with resources, such as hardware, storage, management solutions, security solutions, business applications, etc. available as services via networking. Cloud 160 may generally offer its services as infrastructure as a service (IaaS), platform as a service (PaaS), software as a service (SaaS), network as a service (NaaS), and communication as a service (CaaS). Moreover, cloud 160 may specifically offer services supporting a user to configure user customizable operational features of a vehicle, based on one or more service types, such as IaaS, PaaS, SaaS, NaaS, or CaaS. Furthermore, such services may be made available on demand and to be delivered economically.

In embodiments, cloud 160 may include one or more service devices, for example, server 162 and/or data server 164, hereinafter, collectively referred to as "user preference server," incorporated with the teachings of the present disclosure, to cooperatively enable a user to configure user customizable operational features of a vehicle. In embodiments, server 162 may be application servers, which may perform application related logic relating to configuration of user customizable operational features of a vehicle. In embodiments, data server 164 may be configured to provide database services for configuring user customizable operational features of a vehicle, so that user preferences may be queried, managed, stored, and retrieved from a storage.

In embodiments, system 100 may be configured to interface with any online service, such as online social networks. As an example, users may share their preferences for configuring user customizable operational features of vehicles within their social networks. As a result, a user's preferences for configuring user customizable operational features of vehicles may be dynamically updated, for example, according to the recommendation from the user's friends in a social network. For instance, a friend of the user may recommend driving a sport car in a performance or manual shift mode. The user may accept the recommendation, and have the recommendation be incorporated as part of her preferences for configuring user customizable operational features of vehicles, for example, to be applied whenever she operates a vehicle of the sport car made/model.

In embodiments, the user preference server may be configured to serve multiple mobile devices associated with a user, as well as multiple users. The user preference server may be configured to register or associate the multiple devices with a user through, for example, the user's email address, phone number, driver's license number, student identification number, passport number, or any other suitable credential. The user preference server may receive preference updates from one mobile or desktop device of a user, and update another mobile device of the user accordingly. In embodiments, user preference update may be configured to be manual or automatic, with or without user intervention.

In embodiments, cloud 160 may include one or more wireless and/or wired networks operatively couple the user devices to the user preference server. The networks may include public and/or private networks, such as, but not limited to, the Internet, a telephone network (e.g., public switched telephone network (PSTN)), a local area network (LAN), a wide area network (WAN), a cable network, an Ethernet network, and so forth. In embodiments, user devices may be coupled to these networks via a cellular network and/or a wireless connection. Wireless communication networks may include various combinations of WPANs, WLANs, wireless metropolitan area networks (WMANs), and/or wireless wide area networks (WWANs).

Figure 2:
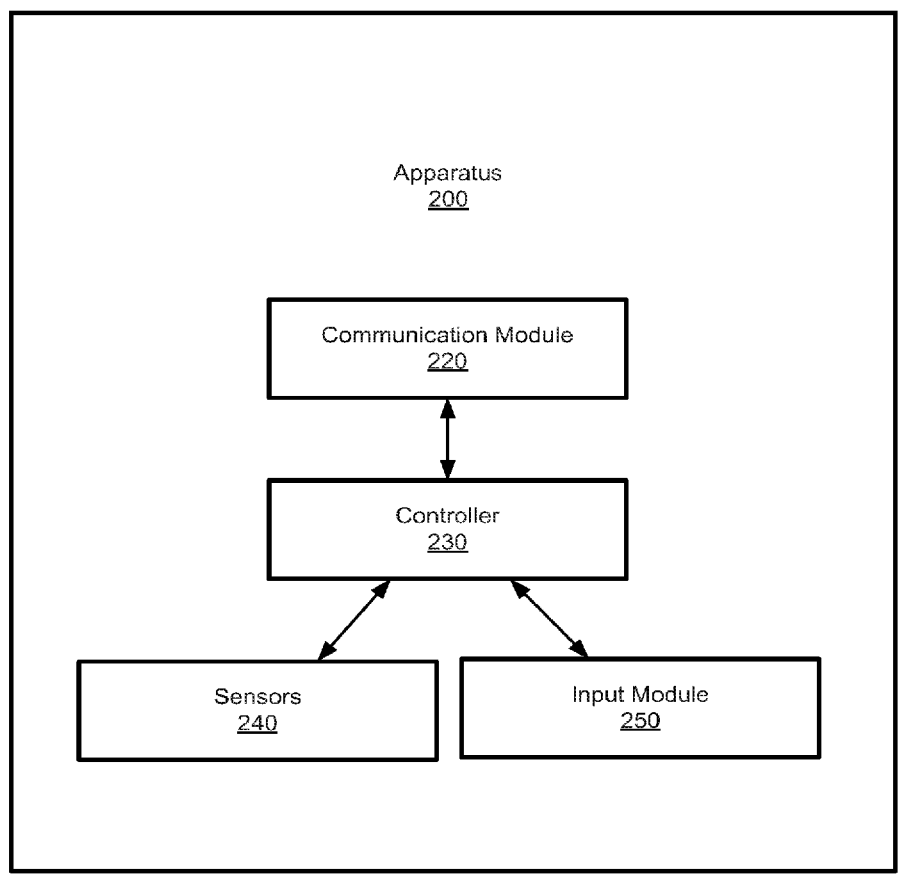
FIG. 2 is a schematic diagram illustrating an example apparatus for configuring user customizable operational features of a vehicle, incorporating aspects of the present disclosure, in accordance with various embodiments.

Referring now to FIG. 2, an example apparatus 200 for configuring user customizable operational features of a vehicle, in accordance with various embodiments, is illustrated. In embodiments, apparatus 200 may be installed in a vehicle as an independent device or integrated into an existing infotainment system of the vehicle. In embodiments, apparatus 200 may include communication module 220, controller 230, sensors 240, and input module 250, selectively coupled with each other, as shown. As will be described in more detail below, apparatus 200 may be incorporated with the teachings of the present disclosure to enable configuration of user customizable operational features of a host vehicle of the apparatus.

In embodiments, communication module 220 may be configured to communicate with a remote server or service in cloud 160, such as the user preference server in connection with FIG. 1, via a wired or wireless network. In embodiments, communication module 220 may use a variety of modulation techniques to communicate with the user preference server via wireless links, such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques. In embodiments, a mobile device may be configured to communicate with the user preference server via communication module 220 with its various communication techniques.

In embodiments, communication module 220 may be configured to communicate with a mobile device, such as wearable devices 120 and 130, or user devices 140 and 150. In embodiments, communication module 220 may be configured to communicate with the mobile device using numerous networking hardware and/or interfaces, e.g., modems, near field communication (NFC) controllers, personal network interface controllers (PNICs), wireless network interface controller (WNIC). An example of a PNICS may include, but is not limited to a PNICS that support a frequency hopping communication protocol, such as a Bluetooth® NIC.

In embodiments, communication module 220 may operate in accordance with various short-range communication technologies that consume low power. As an example, communication module 220 may communicate with a user device in a point-to-point network using NFC. In embodiments, communication module 220 may communicate with a user device in a wireless personal area network (WPAN) using Bluetooth®, Bluetooth® low energy (BLE), Infrared Data Association (IrDA), Wireless USB, ultra-wide band (UWB), Z-Wave, ZigBee, etc. In some other embodiments, communication module 220 may also enable communication via visible light, infrared, sonic, or other communication modes besides radio-based communication.

Controller 230 may obtain the preferences of a user from a mobile device associated with the user, and adjust the user customizable operational features of the vehicle based at least in part on the obtained preferences of the user. In embodiments, user customizable operational features of a vehicle may be adjusted according to the location of the user in a vehicle, e.g., whether the user is the driver or a passenger. In some embodiments, sensors 240 may be operatively coupled with the controller, and configured to detect a location of the user in the vehicle, and provide the location to the controller. Sensors 240 may communicate location information with controller 230 via a broad range of wired or wireless interfaces, including but are not limited to, NFC, I2C bus, universal serial bus, Bluetooth®, Zigbee, and the like. In embodiments, input module 250 may be operatively coupled with the controller, and configured to enable the user to provide to the controller of the location of the user in the vehicle. In some embodiments, input module may have a touch screen so that a user may intuitively communicate to controller 230 of her location in the vehicle. In some embodiments, input module may have a touch screen, keyboard, or the like input device so that a user may communicate to controller 230 of her location in the vehicle via the direct manipulation interface. In some embodiments, input module may be enabled by technologies of human-machine communication by voice or gesture so that a user may vocally communicate, or via gestures, to controller 230 of her location in the vehicle. In embodiments, location information may enable controller 230 to selectively utilize a user's preferences. As an example, a user may have different preferences for being a driver or a passenger, being sitting on a front or back seat, or being sitting on left, middle, or right of the vehicle, and so on. Resultantly, apparatus 200 may enable drivers and passengers situated inside the vehicle to configure user customizable operational features of the vehicle according to the location of individual user.

In embodiments, sensors 240 may include different types of sensors configured to detect the location of a user. In embodiments, sensor 240 may include one or more image sensors which may convert an optical image into an electronic signal, thus enable controller 230 to detect the location of a user based on, e.g., facial recognition techniques. In embodiments, sensor 240 may include acoustic or the like sensors, such as microphone or the like, which may detect the location of a user based on acoustic location techniques. In embodiments, sensor 240 may include electric current/potential, magnetic, pressure, or the like sensors, such as electroscope, magnetometer, piezometer, transducer, or the like, which may detect the location of a user based on the change of electric current/potential, magnetic fields, pressure, or other measurements caused by a user sitting at a seat. For example, these types of sensors may be selectively placed around a seat, such as under the seat. In embodiments, sensor 240 may include optical, light, or the like sensors, such as electro-optical sensors, photoelectric sensors, or the like, which may detect the location of a user by converting the change of light transmission into an electronic signal. In embodiments, sensor 240 may include proximity, presence, or the like sensors, such as motion sensors that may measure optical changes in the field of view, and transform the detection of motion into an electric signal. In other embodiments, other types of sensors may be used in detecting the location of a user.

In embodiments, sensors 240 may be fixed or removably disposed at a number of locations at the sides or interior space of the vehicle compartment. In embodiments, sensors 240 may be brought into the vehicle by its drivers or passengers. As an example, a smartphone may be equipped with various sensors that may be used in locating the relative location of the smartphone, thus its user, in the vehicle. The smartphone may then communicate with controllers 230 in reporting the location.

In embodiments, controller 230 may be configured to request a mobile device of a user, such as wearable devices 120 or 130, or user devices 140 or 150, to retrieve the preferences of the user stored in the mobile device. In embodiments, the controller may be further configured to request the mobile device to retrieve the preferences of the user stored in a remote device accessible to the mobile device. In embodiments, controller 230 may then adjust one or more settings of steering wheel position, head restraint position, lights, seat, mirror, seat belt, air bag, transmission, performance or economy mode of operation, window, interior climate, infotainment, etc. based at least in part on the obtained preferences of the user.

In embodiments, controller 230 may adjust one or more settings of one or more user customizable features of a vehicle by issuing commands to one or more mechanical or electrical components of the vehicle. In embodiments, controller 230 may be coupled to the one or more mechanical or electrical components via one or more communication buses, e.g., a I2C bus.

Figure 3:
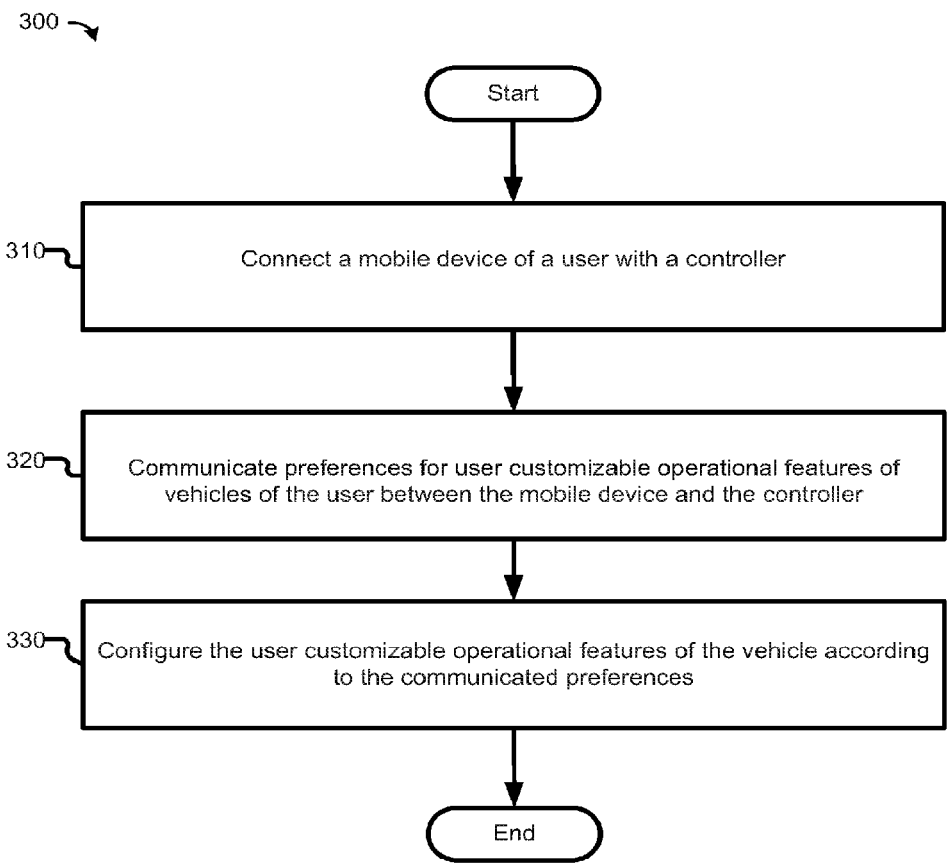
FIG. 3 is a flow diagram of an example process for configuring user customizable operational features of a vehicle, which may be practiced by an example apparatus, incorporating aspects of the present disclosure, in accordance with various embodiments.

Referring now to FIG. 3, it is a flow diagram of an example process for configuring user customizable operational features of a vehicle which may be practiced by an example apparatus incorporating aspects of the present disclosure, in accordance with various embodiments. As shown, process 300 may be performed by apparatus 200 to implement one or more embodiments of the present disclosure. In embodiments, an apparatus incorporated with the teachings of this disclosure may enable a user's preferences for user customizable operational features of vehicles to become portable, further may enable the user customizable operational features of a vehicle to be adjusted based at least in part on the portable preferences of the user. Resultantly, a user's experience in using vehicles may be enhanced.

In embodiments, the process may begin at block 310, where a mobile device of a user may be communicatively connected to a controller of a vehicle. In embodiments, one or more of wearable devices 120 and 130 as well as user devices 140 and 150 may be communicatively connected to controller 230. In embodiments, the mobile device of the user may be communicatively connected to controller 230 via communication module 220, using one or more numerous networking hardware and/or interfaces contained in communication module, such as its WNIC. In some embodiments, communication module 220 may operate in accordance with various short-range communication technologies that consume low power. As an example, communication module 220 may communicate with a user device using NFC. As another example, communication module 220 may communicate with a user device using Bluetooth® or BLE. In some embodiments, the communication between the user mobile device and the controller may need user intervention. As an example, user device 140 may initiate a new connection session with apparatus 200, user confirmation via input module 250 may be needed for authorizing the user device to apparatus 200 or other security considerations. In some embodiments, the communication between the user mobile device and the controller may be automated. As an example, user device 150 may have been previously paired with apparatus 200, and the subsequent connection may be made transparent to the user without user intervention.

Next, at block 320, preferences for user customizable operational features of vehicles of the user may be communicated from the mobile device to the controller. In embodiments, controller 230 may be configured to retrieve preferences for user customizable operational features of vehicles of the user from the mobile device. In embodiments, controller 230 may be configured to request the mobile device to retrieve the preferences of the user stored in the mobile device, such as user device 140 or 150. In embodiments, controller 230 may be configured to request the mobile device to retrieve the preferences of the user stored in a remote device accessible to the mobile device, such as the user preference server in cloud 160.

Next, at block 330, the user customizable operational features of the vehicle may be configured, e.g., by controller 230, according to the communicated preferences of the user. In embodiments, controller 230 may adjust driving related user customizable operational features of the vehicle, such as the mode of operation, steering and suspension systems, safety features, etc. In embodiments, controller 230 may adjust comfort related user customizable operational features of the vehicle, such as climate control, sunroof control, window control, etc. In embodiments, controller 230 may adjust infotainment related user customizable operational features of the vehicle, such as telephone functions, navigation functions, audio functions, etc.

In embodiments, controller 230 may be configured to adjust user customizable operational features of the vehicle based on the user preferences for one or more mechanical or electronic components or systems of the vehicle. As an example, a user may prefer to keep a fixed distance between her seat and the gas pedal. In this case, controller 230 may adjust the seat position accordingly. In embodiments, controller 230 may be configured to adjust user customizable operational features of the vehicle based on one or more goal-oriented preferences. As an example, a user may have the goal to save fuel during city driving. In this case, controller 230 may change the engine and transmission into eco or economy mode, or even turn off air conditioning and open sunroof to further increase gas mileage in a holistic approach to accomplish the goal-oriented preference.

In embodiments, a user may manually change one or more settings of one or more user customizable operational features of the vehicle. In embodiments, process 300 may be extended to include sending the changes from controller 230 to the mobile device for saving in the mobile device or in cloud 160. The user may be prompted for confirmation before the changes are sent.

Figure 4:
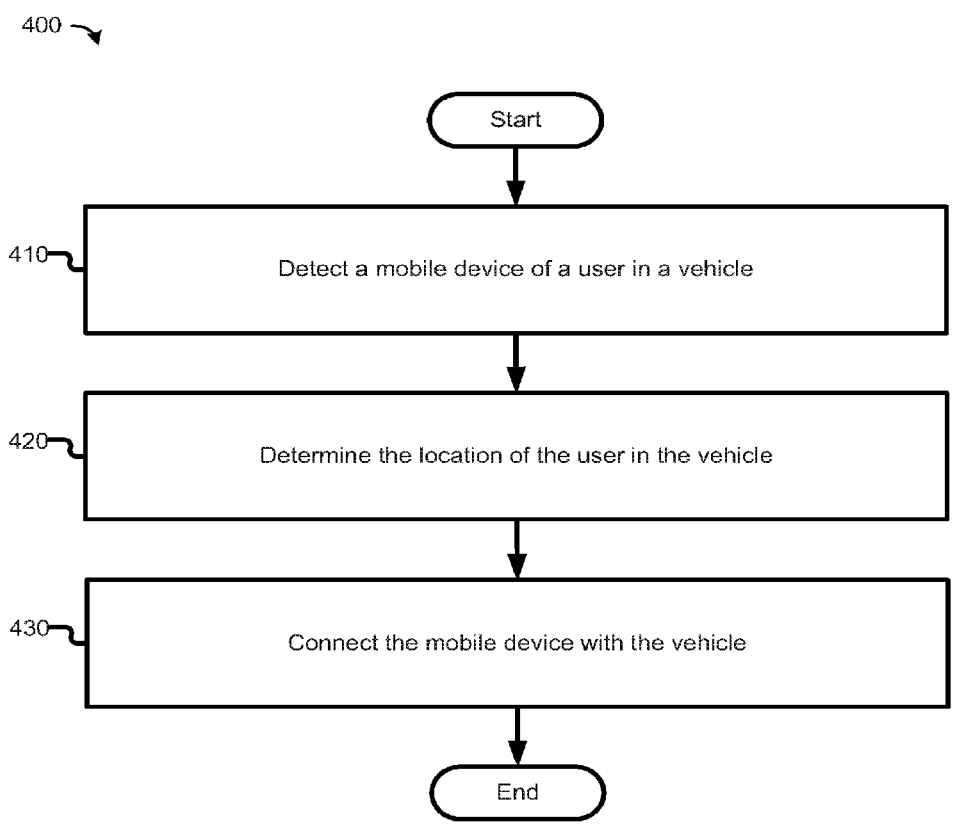
FIG. 4 is a flow diagram of an example process for connecting a mobile device with a controller of a vehicle, which may be practiced by an example apparatus, incorporating aspects of the present disclosure, in accordance with various embodiments.

Referring now to FIG. 4, it is a flow diagram of an example process for connecting a mobile device with a controller of a vehicle, which may be practiced by an example apparatus incorporating aspects of the present disclosure, in accordance with various embodiments. As shown, process 400 may be performed by apparatus 200 to implement one or more embodiments of the present disclosure. In embodiments, process 300 may be performed in reference to block 310 in FIG. 3.

In embodiments, the process may begin at block 410, where a mobile device of a user may be detected in a vehicle, e.g., by communication module 220. In embodiments, a mobile device may be placed into a cradle or otherwise physically connected to communication module 220, thus may be detected by communication module 220. In embodiments, a vehicle may be equipped with one or more NFC chips coupled with communication module 2230, and installed in various locations of the vehicle. In some embodiments, NFC chips in the vehicle may be NFC readers/writers, while NFC tags may be installed in a user mobile device. In some embodiments, NFC chips in the vehicle may be responsible for generating the radio field, while NFC tags in the mobile device may use load modulation to transfer data. In embodiments, the user mobile device may be placed in the radio field generated by NFC chips in the vehicle, thus the mobile device may be detected. In embodiments, both the vehicle and the mobile device may be equipped with Bluetooth-enabled chips. Once the mobile device is brought into the vehicle, it may automatically initiate an inquiry to find out what access points are within its range. As a result, the mobile device may be detected. In embodiments, communication module 220 may be coupled with a WiFi access point, thus it may detect WiFi-enabled user mobile devices once they are been brought near or into the vehicle. In embodiments, communication module 220 may enable ad hoc WiFi transmission with user mobile devices. In embodiments, a user may directly input the information of a mobile device via input module 250 to apparatus 200. In embodiments, a mobile device may also be detected by sensors 240, such as based on the radio or other forms of energy emitted by the mobile device. In other embodiments, detection of the mobile device may be made feasible with many other wired or wireless communication technologies.

Next, at block 420, the location of the user in the vehicle may be determined, e.g., by sensors 240. In embodiments, sensors 240 may be operatively coupled with controller 230, and configured to detect a location of the user in the vehicle, and provide the location to the controller. The location of the user may be used as a parameter in configuring user customizable operational features of the vehicle. As an example, the image of the user may be stored in a user mobile device and retrieved by controller 230, and sensors 240 may include one or more image sensors to capture images in the vehicle.

Therefore, controller 230 may utilize aforementioned information for detecting the location of users, e.g., based on facial recognition techniques.

In embodiments, the location of the user in the vehicle may be determined based at least in part on a mobile user device. In some embodiments, subsequent to or concurrent with the detection of the mobile device in the vehicle, the relative location of the mobile device in the vehicle may also be detected, such as via some position location techniques (e.g., triangulation, circulation, etc.) based on multiple references in the vehicle. In this case, the location of the user may be inferred from the location of the mobile device. In some embodiments, a mobile user device may be equipped with various sensors that may be used in determining the relative position of the user in the vehicle. In embodiments, input module 250 may be operatively coupled with the controller, and configured to enable the user to provide to the controller of the location of the user in the vehicle. As an example, multiple users may bring multiple wearable devices into the vehicle, or a user may bring multiple user devices into the vehicle. In this case, the location of each user may be explicitly communicated to controller 230, for example, via input module 250. As an example, input module 250 may prompt users to associate seats with user devices through a touch-screen. Thus, user customizable operational features of the vehicle may be configured according to different user preferences at different seats.

Next, at block 430, the mobile device may be communicatively connected to the vehicle, e.g., via communication module 220. In embodiments, a NFC-enabled user device within the operating range of the NFC reader/write in the vehicle may establish connection with each other. In some embodiments, such connection may be established automatically without user intervention. In some embodiments, such connection may prompt user to additionally input credential information for authorization, such as before read or write information to any NFC device. In embodiments, a low-speed NFC connection may be used to bootstrap a more capable wireless connection, such as a Bluetooth connection. As an example, the Android Beam™ software may use NFC to establish a Bluetooth connection. In embodiments, a Bluetooth-enabled user device may go through several typically steps to establish a connection, partially due to the frequency hopping nature of the devices, for example, paging, link establishment, service discovery, etc. In embodiments, authentication may be another step in establish a connection. As an example, a user may be prompted for a password to access the vehicle based WiFi network for enhanced security. Once a connection is established, a user's preferences for user customizable operational features of vehicles may be communicated between the mobile device and controller 230, illustrated further in connection with FIG. 5.

Figure 5:
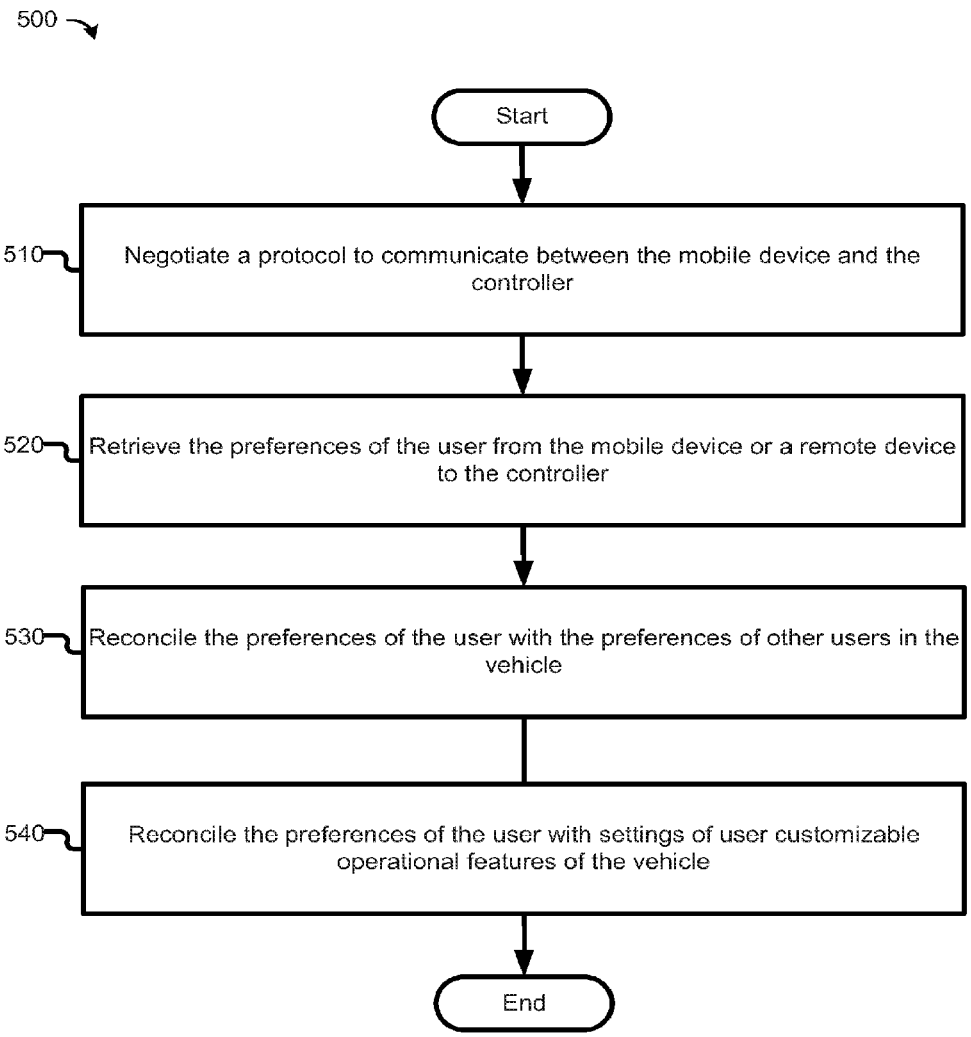
FIG. 5 is a flow diagram of an example process for communicating preferences of a user for user customizable operational features of vehicles, which may be practiced by an example apparatus, incorporating aspects of the present disclosure, in accordance with various embodiments.

Referring now to FIG. 5, it is a flow diagram of an example process for communicating preferences for user customizable operational features of vehicles of a user, which may be practiced by an example apparatus in accordance with various embodiments. As shown, process 500 may be performed by apparatus 200 to implement one or more embodiments of the present disclosure. In embodiments, process 500 may be performed in reference to block 320 in FIG. 3.

In embodiments, the process may begin at block 510, where the protocol to communicate user preferences between the mobile device and controller 230 may be negotiated. In embodiments, controller 230 may capable to communicate with the mobile device in accordance with a selected one of a frequency hopping, near field, or hypertext transfer communication protocol via communication module 220. In embodiments, controller 230 may capable to communicate with the mobile device in accordance with different versions of the same communication protocol, such as different versions of Hypertext Transfer Protocol (HTTP), different versions of Bluetooth®, etc. In embodiments, controller 230 may capable to communicate with the mobile device in accordance with different formats of user preference data. As an example, user preference data may be stored in a Bluetooth® profile for exchanging user preferences for user customizable operational features of vehicles. In some embodiments, Bluetooth profile may be customized for the purpose of exchanging of user preferences for user customizable operational features of vehicles. In other embodiments, some existing generic Bluetooth profiles (e.g., generic attribute profile and generic object exchange profile) may be adapted for this purpose. As another example, user preference data may be stored according to an extensible markup language (XML) schema or other type of markup language schema for exchanging user preferences for user customizable operational features of vehicles. Thus, the mobile device and controller 230 may negotiate how the user preference data may be packaged, and how the user preference data may be communicated via a communication protocol.

Next, at block 520, the preferences of the user may be retrieved from the mobile device or a remote device to controller 230. In embodiments, controller 230 may be configured to request the mobile device to retrieve the preferences of the user stored in the mobile device. In embodiments, the controller may be further configured to request the mobile device to retrieve the preferences of the user stored in a remote device accessible to the mobile user device, such as the user preference server in connection with FIG. 1. In embodiments, controller 230 may be further configured to retrieve the preferences of the user stored in the remote device directly with the credential provided by the mobile user device. For example, controller 230 may have better network access than the mobile user device. In this case, networking functions may be carried out by communication module 220 instead of the mobile user device.

Next, at block 530, the preferences of the user may be reconciled with the preferences of other users in the vehicle, e.g., by controller 230. In embodiments, multiple sets of user preferences for user customizable operational features of vehicles may be received by controller 230, for example, when multiple persons are accommodated in the same vehicle. User preferences for a common user customizable operational feature may conflict with each other. As an example, users may have different preferences for climate control or radio station selections. In embodiments, controller 230 may reconcile conflicted user preferences based on user roles. As an example, controller 230 may prioritize the driver's preferences comparing to the passenger's preferences. In embodiments, controller 230 may reconcile conflicted user preferences based on user location. As an example, controller 230 may associate different user preference settings with different zones inside the vehicle, such as for zone-based climate control. In embodiments, controller 230 may reconcile conflicted user preferences based on their common acceptable values, for example, the common set of preferred radio station selections, or the common set of music genres. In embodiments, controller 230 may reconcile conflicted user preferences based on other rules or methods.

Next, at block 540, the preferences of the user may be reconciled with settings of user customizable operational features of the vehicle, e.g., by controller 230. In embodiments, controller 230 may match the user's preferences for user customizable operational features of vehicles with current available user customizable operational features of the vehicle. As an example, a user may have multiple sets of preferences for user customizable operational features of vehicles. For instance, a user may have different sets of preferences based on the type or the model of the vehicle. In this case, controller 230 may use the particular set of user preferences that matches the model of the vehicle.

In embodiments, the preferences of the user may cannot be fully accommodated in a particular vehicle. As an example, a user may prefer to listen to a particular paid satellite radio station, but the vehicle may lack the receiver to receive the satellite radio station. In this case, controller 230 may intelligently locate a similar radio station to substitute the user preferred radio station. As another example, a user may prefer to receive a shoulder, back, or lumber massage to add some relaxation to her long journey. However, the seat in the vehicle may lack the massage function. In this case, controller 230 may skip this user preference, or adjust the seat accordingly to give the max comfort during a long drive.

Figure 6:
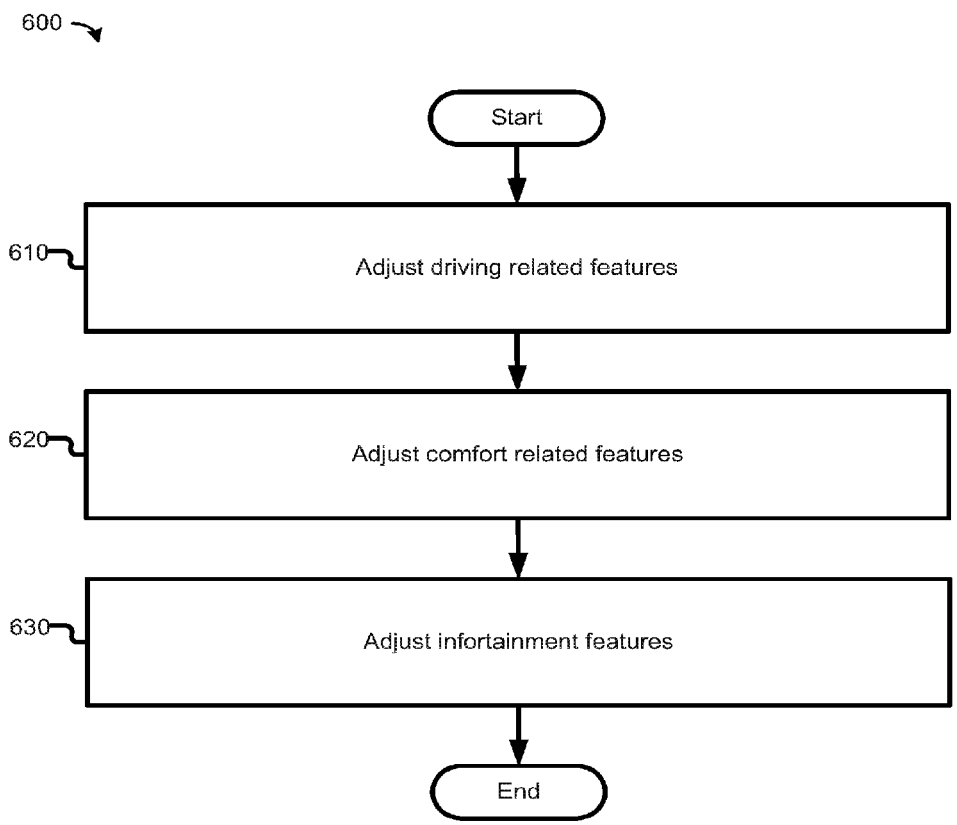
FIG. 6 is a flow diagram of an example process for configuring user customizable operational features of a vehicle, which may be practiced by an example apparatus, incorporating aspects of the present disclosure, in accordance with various embodiments.

Referring now to FIG. 6, it is a flow diagram of an example process for configuring user customizable operational features of a vehicle, which may be practiced by an example apparatus in accordance with various embodiments. As shown, process 600 may be performed by apparatus 200 to implement one or more embodiments of the present disclosure. In embodiments, process 600 may be performed in reference to block 330 in FIG. 3.

In embodiments, the process may begin at block 610, where driving related user customizable operational features may be adjusted. For example, controller 230 may adjust basic driving related user customizable features of the vehicle according to the user preferences, such as settings for mode of operation (e.g. normal, comfort, sport, or eco mode for engine and transmission, etc.), tires (e.g. pressure for self-inflating tires, etc.), brakes (e.g. sensitivity of the brake controller, etc.), positioning (e.g. seat, steering wheel position, head restraint position, mirror, etc.), safety (e.g. seat belt, airbags, etc.), lights and wipers (e.g. headlights, taillights, windscreen wiper, headlight wipers, rear wipers, etc.), and/or other driving related user customizable operational features of the vehicle.

Next, at block 620, where comfort related user customizable operational features may be adjusted. For example, controller 230 may adjust comfort related user customizable features of the vehicle according to the user preferences, such as settings for climate control (e.g., temperature and fan settings, etc.), active suspension (e.g., air suspension, magnetic suspension, etc.), massaging seats (e.g. position or mode of massage, etc.), ventilated seats (e.g., airflow settings, etc.), ergonomics (e.g., adjustable armrest to adequately facilitate persons of varying shapes, sizes and weight), and/or other comfort related user customizable operational features of the vehicle.

Next, at block 630, where infortainment related user customizable operational features may be adjusted. For example, controller 230 may adjust infortainment related user customizable features of the vehicle according to the user preferences, such as settings for navigation (e.g., map version, may layers, preferences for highway or toll free roads, etc.), entertainment (e.g., satellite radio, premium audio system, rear seat entertainment, etc.), communication functions (e.g., voice activated dialing/operation, selection of mobile phone or in-car phone, communication based on voice or text, etc.), and/or other infortainment related user customizable operational features of the vehicle.

In embodiments, controller 230 may be configured to download a vehicle side of the virtual assistant from the mobile phone, and the vehicle side of the virtual assistant may be configured to conform to a mobile device side of the virtual assistant. As an example, the infotainment system in the vehicle may be equipped with an intelligent virtual assistant (IVS) with its own virtual personalities. However, a user device may be equipped with its IVS, such as a version of Apple Siri®, Google Now™, or Samsung's S Voice®. In embodiments, some features of the IVS located with the user device may be downloaded to controller 230, and controller 230 may conform the vehicle loaded IVS to the user device loaded IVS. Thus, the user may gain instant familiarity for the personalities and features of the IVS. In embodiments, controller 230 may be further configured to obtain other preferences for user customizable operational features of vehicles of a user from the IVS on the mobile phone or the IVS on the vehicle.

Figure 7:
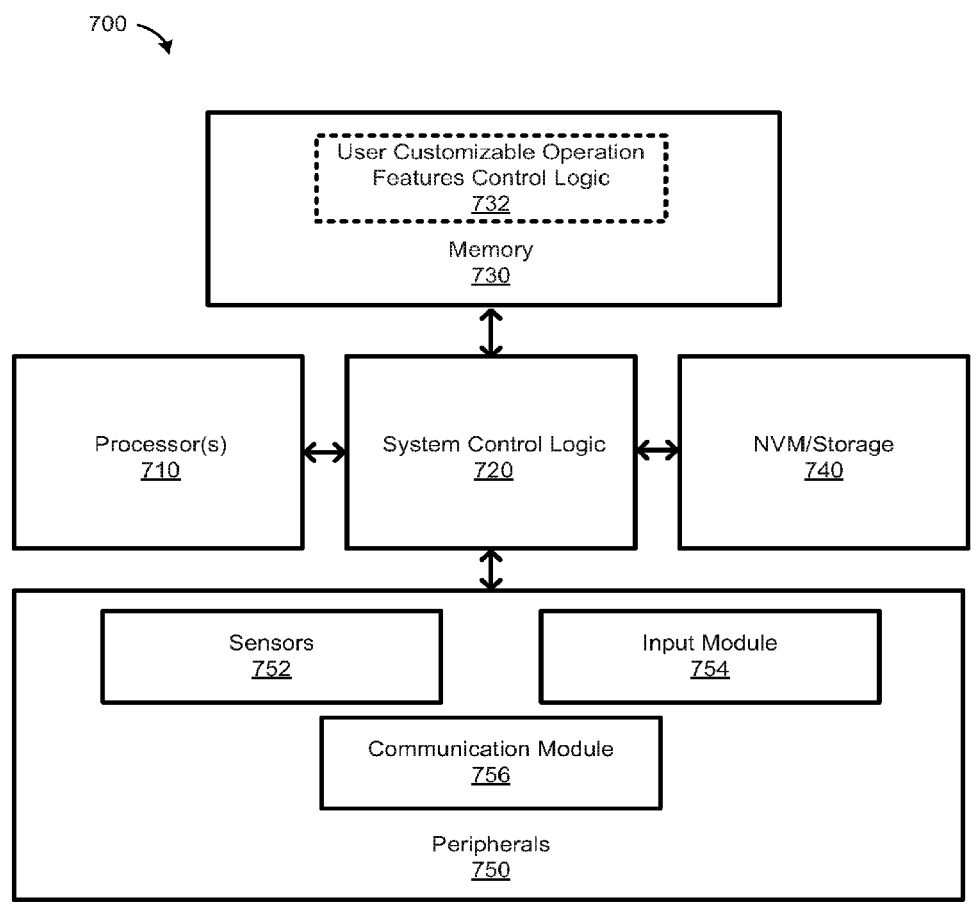
FIG. 7 illustrates an example computing device suitable for practicing the disclosed embodiments, in accordance with various embodiments.

FIG. 7 illustrates an embodiment of a computing device 700 suitable for practicing embodiments of the present disclosure. As illustrated, computing device 700 may include system control logic 720 coupled to one or more processor(s) 710, to system memory 730, to non-volatile memory (NVM)/storage 740, and to one or more peripherals 750. In various embodiments, the one or more processors 710 may include a processor core. In embodiments, peripherals 750 may also include one or more sensors 752, similar to earlier described sensors 240 in connection with FIG. 2, which may be stationarily or movably coupled with computing device 700, configured to detect the location of a user in a vehicle. In embodiments, peripherals 750 may also include input module 754, similar to earlier described input module 250 in connection with FIG. 2, which may be stationarily or movably coupled with computing device 700, configured to enable a user to provide to computing device 700, a location of the user in a vehicle.

In some embodiments, system control logic 720 may include any suitable interface controllers to provide for any suitable interface to the processor(s) 710 and/or to any suitable device or component in communication with system control logic 720. System control logic 720 may also interoperate with a display (not shown) for display of information, such as to a user. In various embodiments, the display may include one of various display formats and forms, such as, for example, liquid-crystal displays, cathode-ray tube displays, e-ink displays, projection displays. In various embodiments, the display may include a touch screen.

In some embodiments, system control logic 720 may include one or more memory controller(s) (not shown) to provide an interface to system memory 730. System memory 730 may be used to load and store data and/or instructions, for example, for computing device 700. System memory 730 may include any suitable volatile memory, such as suitable dynamic random access memory (DRAM), for example.

In some embodiments, system control logic 720 may include one or more input/output (I/O) controller(s) (not shown) to provide an interface to NVM/storage 740 and peripherals 750. NVM/storage 740 may be used to store data and/or instructions, for example. NVM/storage 740 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 740 may include a storage resource that is physically part of a device on which computing device 700 is installed or it may be accessible by, but not necessarily a part of, computing device 700. For example, NVM/storage 740 may be accessed by computing device 700 over a network via communication module 756.

In embodiments, system memory 730, NVM/storage 740, and system control logic 720 may include, in particular, temporal and persistent copies of user customizable operation features control logic 732. The user customizable operation features control logic 732 may include instructions that, when executed by at least one of the processor(s) 710, result in computing device 700 practicing one or more aspects of configuring user customizable operational features of a vehicle, such as, but not limited to, processes 300, 400, 500, and 600, as well as other operations performed by controller 230 in connection with FIG. 2, described above.

Communication module 756 within peripherals 750 may provide an interface for computing device 700 to communicate over one or more network(s) and/or with any other suitable device. Communications module 756 may include any suitable hardware and/or firmware, such as a network adapter, one or more antennas, wireless interface(s), and so forth. In various embodiments, communication module 756 may include an interface for computing device 700 to use NFC, optical communications, or other similar technologies to communicate directly (e.g., without an intermediary) with another device. In various embodiments, communication module 756 may interoperate with radio communications technologies such as, for example, WCDMA, GSM, LTE, Bluetooth®, Zigbee, and the like. In embodiments, communication module 756 may include a sensor interface, which enables computing device 700 to communicate with sensors 752 that is stationarily or moveably coupled with computing device 700.

In some embodiments, at least one of the processor(s) 710 may be packaged together with system control logic 720 and/or user customizable operation features control logic 732. In some embodiments, at least one of the processor(s) 710 may be packaged together with system control logic 720 and/or user customizable operation features control logic 732 to form a System in Package (SiP). In some embodiments, at least one of the processor(s) 710 may be integrated on the same die with system control logic 720 and/or user customizable operation features control logic 732. In some embodiments, at least one of the processor(s) 710 may be integrated on the same die with system control logic 720 and/or user customizable operation features control logic 732 to form a System on Chip (SoC).

Depending on which modules of apparatus 200 in connection with FIG. 2 are hosted by computing device 700, the capabilities and/or performance characteristics of processors 710, system memory 730, and so forth, may vary. In various implementations, computing device 700 may be integrated into a land vehicle, a watercraft, a sailcraft, an aircraft, a hovercraft, a spacecraft and/or any vehicle suitable for transporting passengers or cargo, enhanced with the teachings of the present disclosure. In particular, in embodiments, computing device 700 may also host the infotainment system of the vehicle.

Figure 8:
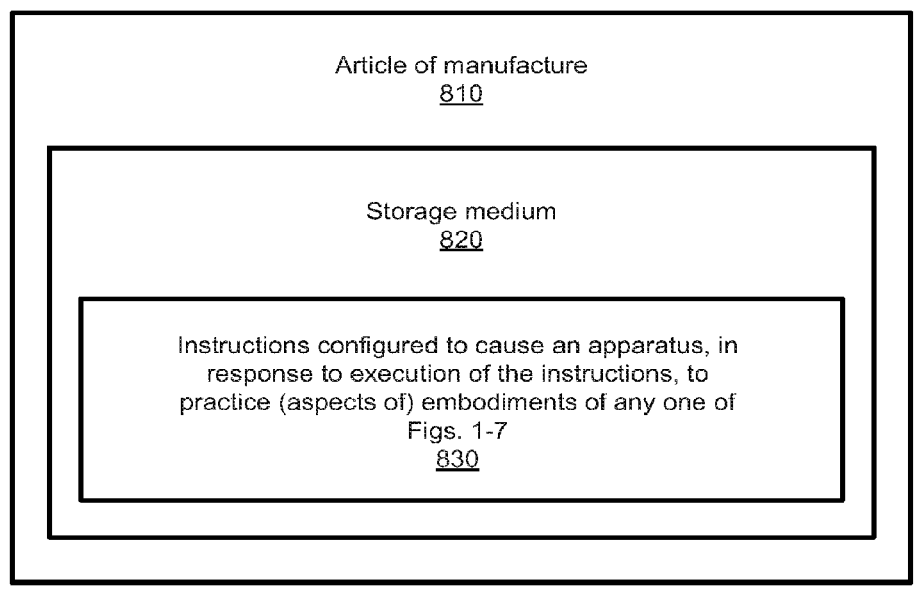
FIG. 8 illustrates an article of manufacture having programming instructions, incorporating aspects of the present disclosure, in accordance with various embodiments.

FIG. 8 illustrates an article of manufacture 810 having programming instructions, incorporating aspects of the present disclosure, in accordance with various embodiments. In various embodiments, an article of manufacture may be employed to implement various embodiments of the present disclosure. As shown, the article of manufacture 810 may include a computer-readable non-transitory storage medium 820 where instructions 830 configured to practice embodiments of or aspects of embodiments of any one of FIGS. 1-7. The storage medium 820 may represent a broad range of persistent storage medium known in the art, including but not limited to flash memory, dynamic random access memory, static random access memory, an optical disk, a magnetic disk, etc. Instructions 830 may enable an apparatus, in response to their execution by the apparatus, to perform various operations described herein. For example, storage medium 820 may include instructions 830 configured to cause an apparatus or system to practice some or all aspects of configuring user customizable operational features of a vehicle of the process 300 of FIG. 3, process 400 of FIG. 4, process 500 of FIG. 5, or process 600 of FIG. 6, in accordance with embodiments of the present disclosure.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The following paragraphs describe examples of various embodiments.

Example 1 is an apparatus for configuring user customizable operational features of a vehicle which may include a communication module configured to be disposed in the vehicle, and communicate with a mobile device of a user; and a controller configured to be disposed in the vehicle and coupled with the communication module, to obtain from the mobile device, through the communication module, one or more preferences of the user for one or more user customizable operational features of the vehicle, and adjust the one or more user customizable operational features of the vehicle based at least in part on the one or more preferences of the user obtained.

Example 2 may include the subject matter of Example 1, and may further include one or more sensors coupled with the controller, and configured to enable the controller to detect a location of the user in the vehicle.

Example 3 may include the subject matter of Example 2, and further specifies that the one or more sensors may include an image sensor, and the controller is configured to retrieve an image from the mobile device for facial recognition.

Example 4 may include the subject matter of any one of Example 1-3, and may further include a user input module coupled with the controller, and configured to enable the user to provide to the controller, a location of the user in the vehicle.

Example 5 may include the subject matter of any one of Examples 2-4, and further specifies that the controller may be further configured to adjust the one or more user customizable operational features of the vehicle based additionally on the location of the user in the vehicle.

Example 6 may include the subject matter of any one of Examples 1-5, and further specifies that the controller may be configured to request the mobile device to retrieve the one or more preferences of the user stored in the mobile device.

Example 7 may include the subject matter of any one of Examples 1-5, and further specifies that the controller may be further configured to request the mobile device to retrieve the one or more preferences of the user stored in a remote device accessible to the mobile device.

Example 8 may include the subject matter of any one of Examples 1-7, and further specifies that the communication module may be configured to communicate with the mobile device in accordance with a selected one of a frequency hopping, near field, or hypertext transfer communication protocol.

Example 9 may include the subject matter of any one of Examples 1-8, and further specifies that the communication module and the controller may be complementarily configured to obtain the one or more preferences of the user from the mobile device, through a Bluetooth profile of the user having the one or more preferences of the user for the user customizable operational features of the vehicle.

Example 10 may include the subject matter of any one of Examples 1-9, and further specifies that the one or more preferences of the user may include one or more preferences for steering wheel position, head restraint position, light settings, seat settings, mirror settings, seat belt settings, air bag settings, transmission settings, mode of operation, window settings, interior climate settings, or infotainment settings.

Example 11 may include the subject matter of any one of Examples 1-10, and further specifies that the one or more preferences of the user may include one or more preferences for one or more settings for one or more mechanical or electronic components or systems of the vehicle.

Example 12 may include the subject matter of any one of Examples 1-11, and further specifies that the controller may be configured to obtain the one or more preferences of the user from a virtual assistant on the mobile device.

Example 13 may include the subject matter of any one of Examples 1-12, and further specifies that the controller may be configured to download a vehicle side of the virtual assistant from the mobile device, wherein the vehicle side of the virtual assistant is configured to cooperate with a mobile device side of the virtual assistant.

Example 14 may include the subject matter of any one of Examples 1-13, and further specifies that the vehicle may be a rental vehicle, and the user may be a renter of the vehicle, and the communication module may be configured to detect presence of the mobile device, and on detection, establish a communication connection with the mobile device.

Example 15 may include the subject matter of any one of Examples 1-14, and further specifies that the one or more preferences of the user may be updatable based at least in part on a recommendation from a social network.

Example 16 is a method for configuring user customizable operational features of a vehicle which may include connecting, by a controller of the vehicle, with a mobile device of a user; receiving, by the controller, from the mobile device, one or more preferences of the user for one or more user customizable operational features of the vehicle; and configuring, by the controller, the one or more user customizable operational features of the vehicle, by the controller, according to the one or more preferences received.

Example 17 may include the subject matter of Example 16, and may further include associating the user, by the controller, with a location in the vehicle.

Example 18 may include the subject matter of Example 16 or 17, and may further include negotiating with the mobile device, by the controller, a protocol to communicate the one or more preferences of the user from the mobile device to the controller.

Example 19 may include the subject matter of any one of Examples 16-18, and may further include requesting the mobile device, by the controller, to retrieve the one or more preferences of the user from the mobile device, and forward to the controller.

Example 20 may include the subject matter of any one of Examples 16-19, and may further include requesting the mobile device, by the controller, to retrieve the one or more preferences of the user from a remote device, and forward to the controller.

Example 21 may include the subject matter of any one of Examples 16-20, and further specifies that receiving may include receiving, by the controller, from the mobile device, a Bluetooth profile of the user, having the one or more preferences of the user for the one or more customizable operational features of the vehicle.

Example 22 may include the subject matter of any one of Examples 16-21, and may further include receiving, by the controller, from the user, a request to change a setting for one of the one or more user customizable features of the vehicle; adjusting, by the controller, the setting for the one user customable feature of the vehicle; and exporting, by the controller, to the mobile device, the setting for the one user customizable operational feature of the vehicle.

Example 23 may include the subject matter of any one of Examples 16-22, and further specifies that the mobile device may be a first mobile device, the user may be a first user, and the one or more preferences may be first one or more preferences, and the method may further include connecting, by the controller, with a second mobile device of a second user; receiving, by the controller, from the second mobile device, second one or more preferences of the second user for the one or more user customizable operational features of the vehicle; and reconciling the first and second one or more preferences for the user customizable operational features of the vehicle. Example 23 may further specify that configuring may include configuring, by the controller, the one or more user customizable operational features of the vehicle, according to a result of the reconciliation of the first and second one or more preferences.

Example 24 may include the subject matter of any one of Examples 16-23, and further specifies that configuring may include adjusting a setting of a first user customizable operational feature of the vehicle in view of a preference of the user for a setting for a second user customizable operational feature of the vehicle. The first and second user customizable features may be different user customizable features.

Example 25 may include the subject matter of any one of Examples 16-24, and further specifies that configuring may include adjusting, by the controller, one or more setting for one or more mechanical or electronic components or systems of the vehicle.

Example 26 may include the subject matter of any one of Examples 16-25, and further specifies that configuring may include adjusting one or more settings of steering wheel position, head restraint position, lights, seat, mirror, seat belt, air bag, transmission, mode of operation, window, interior climate, or infotainment.

Example 27 may include the subject matter of any one of Examples 16-26, and further specifies that configuring may be further based at least in part on a location of the user in the vehicle.

Example 28 may include the subject matter of any one of Examples 16-27, and further specifies that the one or more preferences of the user may be updatable based at least in part on a recommendation from a social network.

Example 29 is a storage medium having stored therein instructions configured to cause a device, in response to execution of the instructions by the device, to practice the subject matter of any one of Examples 16-28. The storage medium may be non-transient.

Example 30 is an apparatus for configuring user customizable features of a vehicle which may include means to practice the subject matter of any one of Examples 16-28.

Example 31 is an apparatus for configuring user customizable features of a vehicle which may include means to be disposed in the vehicle, for communicating with a mobile device of a user; and means, to be disposed in the vehicle, for obtaining from the mobile device, through the communication module, one or more preferences of the user for one or more user customizable operational features of the vehicle, and adjust the one or more user customizable operational features of the vehicle based at least in part on the one or more preferences of the user obtained.

Example 32 may include the subject matter of Example 31, and may further include means for enabling the controller to detect a location of the user in the vehicle.

Example 33 may include the subject matter of Example 31 or 32, and may further include means for enabling the user to provide to the controller, a location of the user in the vehicle.

What is claimed is:

1. An apparatus, comprising:
    a communication module to be disposed in a vehicle, and communicate with a mobile device of a user;
    a controller to be disposed in the vehicle and coupled with the communication module, to adjust one or more user customizable operational features of the vehicle based at least in part on one or more preferences of the user wherein at least some of the one or more preferences are to be received from the user; and
    an intelligent virtual assistant (IVS) coupled to the controller to facilitate the user in providing the at least some of the one or more preferences;
    wherein the controller is to further download one or more features of another IVS on the mobile device, and conform the IVS on the vehicle to the other IVS on the mobile device based at least in part on the downloaded one or more features of the other IVS on the mobile device.

2. The apparatus according to claim 1, further comprising:
    one or more sensors coupled with the controller, and to enable the controller to detect a location of the user in the vehicle, wherein the controller is further able to adjust the one or more user customizable operational features of the vehicle based additionally on the location of the user in the vehicle.

3. The apparatus according to claim 2, wherein the one or more sensors include an image sensor, and the controller is to retrieve an image from the mobile device for facial recognition.

4. The apparatus according to claim 1, further comprising:
    an input module coupled with the controller, and to facilitate the user to provide to the controller, a location of the user in the vehicle.

5. The apparatus according to claim 1, wherein the controller is to further obtain at least some of the one or more preferences of the user from the mobile device, that are stored in the mobile device or in a remote device accessible to the mobile device.

6. The apparatus according to claim 1, wherein the communication module is to communicate with the mobile device in accordance with a selected one of a frequency hopping, near field, or hypertext transfer communication protocol.

7. The apparatus according to claim 1, wherein the communication module and the controller are complementarily configured to obtain the one or more preferences of the user from the mobile device, through a Bluetooth profile of the user having the one or more preferences of the user for the user customizable operational features of the vehicle.

8. The apparatus according to claim 1, wherein the one or more preferences of the user comprise one or more preferences for steering wheel position, head restraint position, light settings, seat settings, mirror settings, seat belt settings, air bag settings, transmission settings, mode of operation, window settings, interior climate settings, or infotainment settings.

9. The apparatus according to claim 1, wherein the one or more preferences of the user comprise one or more preferences for one or more settings for one or more mechanical or electronic components or systems of the vehicle.

10. The apparatus according to claim 1, wherein the one or more preferences of the user are updatable based at least in part on a recommendation from a social network.

11. The apparatus according to claim 1, wherein the vehicle is a rental vehicle, and the user is a renter of the vehicle, and wherein the communication module is to detect presence of the mobile device, and on detection, establish a communication connection with the mobile device.

12. At least one computer-readable non-transitory storage medium comprising a plurality of instructions to cause an apparatus of a vehicle, in response to execution of the instructions by a controller of the apparatus, to:
connect with a mobile device of a user,
receive from the mobile device, one or more features of an intelligent virtual assistant (IVS) on the mobile device;
conform another IVS of the apparatus to the IVS of the mobile device based at least in part on the downloaded one or more features of the IVS on the mobile device;
receive from the user, via the conformed IVS of the apparatus, one or more preferences of the user for one or more user customizable operational features of the vehicle; and
configure the one or more user customizable operational features of the vehicle, by the controller, according to the one or more preferences received.

13. The storage medium of claim 12, wherein the apparatus is further caused to associate the user with a location in the vehicle, and further configure the one or more user customizable operational features of the vehicle based at least in part on the location of the user in the vehicle.

14. The storage medium of claim 12, wherein the apparatus is further caused to negotiate with the mobile device, a protocol to communicate the one or more preferences of the user from the mobile device to the controller.

15. The storage medium of claim 12, wherein the apparatus is further caused to request the mobile device to retrieve additional one or more preferences of the user stored in the mobile device or a remote device, and forward to the apparatus.

16. The storage medium of claim 12, wherein the apparatus is further caused to receive, from the mobile device, a Bluetooth profile of the user, having the one or more preferences of the user for the one or more customizable operational features of the vehicle.

17. The storage medium of claim 12, wherein the apparatus is further caused to:
receive from the user, a request to change a setting for one of the one or more user customizable features of the vehicle;
adjust the setting for the one user customable feature of the vehicle; and
export to the mobile device, the adjusted setting for the one user customizable operational feature of the vehicle.

18. The storage medium of claim 12, wherein the mobile device is a first mobile device, the user is a first user, and the one or more preferences are first one or more preferences, and wherein the apparatus is further caused to:
connect with a second mobile device of a second user,
receive from the second mobile device, one or more features of an intelligent virtual assistant (IVS) on the second mobile device;
conform the IVS of the apparatus to the IVS of the second mobile device based at least in part on the downloaded one or more features of the IVS on the second mobile device;
receive from the user, via the re-conformed IVS of the apparatus, second one or more preferences of the second user for the one or more user customizable operational features of the vehicle; and
reconcile the first and second one or more preferences for the user customizable operational features of the vehicle;
wherein configure comprises configure the one or more user customizable operational features of the vehicle, according to a result of the reconciliation of the first and second one or more preferences.

19. A method, comprising:
establishing by an apparatus installed in a vehicle, a communication connection with a proximally located mobile device of a user;
receiving, by the apparatus, from the mobile device, one or more features of an intelligent virtual assistant (IVS) on the mobile device;
conforming the IVS of the apparatus to the IVS of the mobile device based at least in part on the downloaded one or more features of the IVS on the mobile device;
receiving from the user, via the conformed IVS of the apparatus, one or more preferences of the user for one or more user customizable operational features of the vehicle; and
configuring, by the apparatus, the one or more user customizable operational features of the vehicle, by the apparatus, according to the one or more preferences received.

20. The method of claim 19, further comprising associating the user, by the apparatus, with a location in the vehicle, wherein configuring is further based at least in part on the location of the user in the vehicle.

21. The method of claim 19, further comprising negotiating with the mobile device, by the apparatus, a protocol to communicate the one or more preferences of the user from the mobile device to the apparatus.

22. The method of claim 19, further comprising requesting the mobile device, by the apparatus, to retrieve additional one or more preferences of the user stored in the mobile device or a remote device, and forward to the apparatus.

23. The method of claim 19, further comprising:
receiving, by the apparatus, from the user, a request to change a setting for one of the one or more user customizable features of the vehicle;
adjusting, by the apparatus, the setting for the one user customable feature of the vehicle; and
exporting, by the apparatus, to the mobile device, the adjusted setting for the one user customizable operational feature of the vehicle.

* * * * *